(12) United States Patent
Jiang (10) Patent No.: US 10,345,980 B2
(45) Date of Patent: Jul. 9, 2019

(54) CAPACITIVE DETECTION DEVICE, METHOD AND PRESSURE DETECTION SYSTEM

(71) Applicant: SHENZHEN GOODIX TECHNOLOGY CO., LTD., Shenzhen (CN)

(72) Inventor: Hong Jiang, Shenzhen (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 53 days.

(21) Appl. No.: 15/871,865

(22) Filed: Jan. 15, 2018

(65) Prior Publication Data

US 2018/0136761 A1 May 17, 2018

Related U.S. Application Data

(63) Continuation of application No. PCT/CN2016/104027, filed on Oct. 31, 2016.

(51) Int. Cl.
*G06F 3/041* (2006.01)
*G06F 3/044* (2006.01)
(Continued)

(52) U.S. Cl.
CPC ............ *G06F 3/044* (2013.01); *G01D 5/241* (2013.01); *G01L 1/144* (2013.01); *G06F 3/0414* (2013.01); *G06F 3/0416* (2013.01)

(58) Field of Classification Search
CPC ......... G06F 3/0414; G06F 3/0416; G06F 3/04
See application file for complete search history.

(56) References Cited

U.S. PATENT DOCUMENTS 6,803,794 B2 10/2004 Martin et al.
6,924,760 B1 8/2005 McLeod et al.
(Continued)

FOREIGN PATENT DOCUMENTS

CN 101073493 A 11/2007
CN 102084593 A 6/2011
(Continued)

OTHER PUBLICATIONS

International Search Report for International Application No. PCT/CN2016/104027, Applicant: Shenzhen Goodix Technology Co., Ltd., dated Oct. 31, 2016, 5 pages.
(Continued)

*Primary Examiner* — Roy P Rabindranath (57) ABSTRACT

A capacitive detection device, a method and a pressure detection system are provided. The capacitive detection device includes a differential amplifier, a first capacitor, a second capacitor, a charging module, a control module and a calculation module. The charging module is controlled by the control module to charge two capacitors to be detected, then an amount of charge of the capacitors to be detected is transferred to the first capacitor and the second capacitor, and a signal is amplified through the differential amplifier and the amplified signal is output to the calculation module, so that a capacitance difference of different capacitors may be obtained through a voltage at an output terminal of the differential amplifier, a supply voltage of the charging module, a capacitance of the first capacitor and a capacitance of the second capacitor.

20 Claims, 8 Drawing Sheets

(51) Int. Cl.
  *G01D 5/241* (2006.01)
  *G01L 1/14* (2006.01)

(56) References Cited

U.S. PATENT DOCUMENTS

| | | | |
|---|---|---|---|
| 7,205,776 B2 | 4/2007 | Kinoshita et al. | |
| 8,619,057 B2* | 12/2013 | Kobayashi | G06F 3/0416 |
| | | | 345/174 |
| 9,367,179 B2 | 6/2016 | Irkliy | |
| 9,389,256 B2* | 7/2016 | Angelini | G06F 3/044 |
| 9,395,850 B2 | 7/2016 | Mamba et al. | |
| 2006/0055416 A1 | 3/2006 | Kinoshita et al. | |
| 2009/0295409 A1 | 12/2009 | Irkliy | |
| 2010/0085322 A1 | 4/2010 | Mamba et al. | |
| 2010/0307840 A1* | 12/2010 | Kobayashi | G06F 3/044 |
| | | | 178/18.06 |
| 2010/0315363 A1 | 12/2010 | Kobayashi et al. | |
| 2011/0122089 A1 | 5/2011 | Kobayashi et al. | |
| 2013/0067984 A1 | 3/2013 | Balachandran et al. | |
| 2013/0249825 A1* | 9/2013 | Kang | G06F 3/03547 |
| | | | 345/173 |
| 2013/0269177 A1 | 10/2013 | Kobayashi et al. | |
| 2015/0338952 A1 | 11/2015 | Shahparnia et al. | |
| 2016/0070381 A1 | 3/2016 | Park et al. | |
| 2016/0313862 A1 | 10/2016 | Mamba et al. | |
| 2017/0003810 A1* | 1/2017 | Byun | G06F 3/044 |
| 2017/0108967 A1* | 4/2017 | Hamaguchi | G06F 3/044 |

FOREIGN PATENT DOCUMENTS

| | | |
|---|---|---|
| CN | 102841715 A | 12/2012 |
| CN | 102882505 A | 1/2013 |
| CN | 104603728 A | 5/2015 |
| CN | 104794433 A | 7/2015 |
| EP | 1635147 A3 | 11/2013 |
| JP | 2011113187 A | 6/2011 |
| KR | 100729913 B1 | 6/2007 |

OTHER PUBLICATIONS

Office Action and Search Report for the corresponding Chinese Patent Application No. 201680001429.X, Applicant: Shenzhen Goodix Technology Co., Ltd., dated Sep. 18, 2017, 5 pages.

\* cited by examiner

CAPACITIVE DETECTION DEVICE, METHOD AND PRESSURE DETECTION SYSTEM

CROSS-REFERENCE TO RELATED APPLICATIONS

This application is a continuation of International Patent Application No. PCT/CN2016/104027, with an international filing date of Oct. 31, 2016, which is hereby incorporated by reference in its entireties.

TECHNICAL FIELD

Embodiments of the present disclosure relates to a field of touch control technologies, and more particularly, to a capacitive detection device, a method, and a pressure detection system.

BACKGROUND

When touch control technology is applied to an intelligent terminal, a user may operate the terminal only through a gesture operation, which gets rid of a traditional mechanical keyboard and makes human-computer interaction more straightforward.

However, with the development of touch control technology, it becomes impossible for touch control technology to meet a user demand for more dimensions input. For example, a capacitive active pen works on a capacitive touch screen to touch the capacitive touch screen. When pressure changes, the touch screen fails to perform different writing operations according to change of the pressure. For another example, on the basis of traditional key or fingerprint identification, no different operations are provided according to change of pressure from a key or a fingerprint. In this case, it is very difficult for touch control technology to simulate experience that a real pen is used for writing, so that an accuracy of input is affected and user experience is not good.

In order to meet the above pressure demand and to enhance user experience, it needs to detect pressure of a screen. When pressure on a mobile phone screen changes, a distance between two electrodes in the mobile phone and capacitance change, so that user pressure information may be obtained by detecting capacitance of a capacitor. The present disclosure provides a capacitive detection device for detecting a capacitance difference between two capacitors.

SUMMARY

Embodiments of the present disclosure provide a capacitive detection device, a method and a pressure detection system, which can detect a large capacitance with a small capacitance and improve accuracy of pressure detection by the capacitive detection of the present disclosure.

According to a first aspect, the present disclosure provides a capacitive detection device, where the device includes a differential amplifier, a first capacitor, a second capacitor, a charging module, a control module and a calculation module, and the differential amplifier includes a first input terminal, a second input terminal, a first output terminal and a second output terminal; the first input terminal is connected to a third capacitor to be detected, and the second input terminal is connected to a fourth capacitor to be detected, the first input terminal and the first output terminal are respectively connected to two ends of the first capacitor, the second input terminal and the second output terminal are respectively connected to two ends of the second capacitor, and both the first output terminal and the second output terminal are connected to the calculation module; in a first phase, the control module is configured to control the charging module to charge the third capacitor and the fourth capacitor, and the control module is further configured to control the first capacitor and the second capacitor to discharge; in a second phase, the control module is configured to control the charging module to terminate charging for the third capacitor and the fourth capacitor, and the control module is further configured to control the third capacitor to discharge to the first capacitor and control the fourth capacitor to discharge to the second capacitor; the differential amplifier is configured to amplify a signal and output the amplified signal from the first output terminal and the second output terminal to the calculation module; and the calculation module is configured to obtain a difference between a capacitance of the third capacitor and a capacitance of the fourth capacitor according to a supply voltage of the charging module, a voltage of the first output terminal, a voltage of the second output terminal, a capacitance of the first capacitor and a capacitance of the second capacitor.

According to an embodiment of the present disclosure, two capacitors to be detected may be charged, then an amount of charge of the capacitors to be detected is transferred to a capacitor in a capacitive detection circuit, and a voltage of the capacitor to be detected after discharge is amplified and output to a calculation module through a differential amplifier, so that detection of capacitance difference of different capacitors may be realized based on calculation of a voltage at an output terminal of the differential amplifier.

Pressure detection may be implemented by using the capacitive detection in the embodiment of the present disclosure, so that detection sensitivity can be improved and effect of user experience may be better.

According to a second aspect, a pressure detection system is provided, where the pressure detection system includes a pressure detection module, at least one capacitive detection device according to any implementation manner of the first aspect, at least one third capacitor and at least one fourth capacitor, where each capacitive detection device corresponds to a third capacitor to be detected and a fourth capacitor to be detected, and the pressure detection module is configured to obtain a detected pressure according to a difference between a capacitance of the at least one third capacitor and a capacitance of the at least one fourth capacitor.

According to a third aspect, a capacitive detection method is provided, where the method is performed by a capacitive detection device and the capacitive detection device includes a differential amplifier, a first capacitor, a second capacitor, a charging module, a control module and a calculation module, and the differential amplifier includes a first input terminal, a second input terminal, a first output terminal and a second output terminal, the first input terminal is connected to a third capacitor to be detected and the second input terminal is connected to a fourth capacitor to be detected, and the method includes: in a first phase, controlling, by the control module, the charging module to charge the third capacitor to be detected and the fourth capacitor to be detected, and controlling the first capacitor and the second capacitor to discharge; in a second phase, controlling, by the control module, the charging module to terminate charging for the third capacitor and the fourth capacitor, controlling the third capacitor to discharge to the first capacitor, and controlling the fourth capacitor to discharge to the second capacitor; amplifying, by the differential amplifier, a signal and outputting the amplified signal from the first output terminal and the second output terminal to the calculation module; and obtaining, by the calculation module, a difference between a capacitance of the third capacitor and a capacitance of the fourth capacitor according to a supply voltage of the charging module, a voltage of the first output terminal, a voltage of the second output terminal, a capacitance of the first capacitor and a capacitance of the second capacitor.

According to an embodiment of the present disclosure, two capacitors to be detected may be charged, then an amount of charge of the capacitors to be detected is transferred to a capacitor in a capacitive detection circuit, and a voltage of the capacitor to be detected after discharge is amplified and output to a calculation module through a differential amplifier, so that detection of capacitance difference of different capacitors may be realized based on calculation of a voltage at an output terminal of the differential amplifier, which may detect a large capacitance with a small capacitance and improve accuracy of pressure detection by the capacitive detection of the present disclosure.

The capacitive detection method according to the embodiment of the present disclosure in the above third aspect may correspond to each unit/module in the capacitive detection device according to the embodiment of the present disclosure of the first aspect. Moreover, corresponding flow in the method may be implemented by each unit/module in the capacitive detection device of the first aspect, and thus detailed description thereof will not be repeated redundantly herein for simplicity.

DESCRIPTION OF EMBODIMENTS

The technical solutions in embodiments of the present disclosure will be described clearly and completely hereinafter with reference to the accompanying drawings in the embodiments of the present disclosure.

Figure 1:
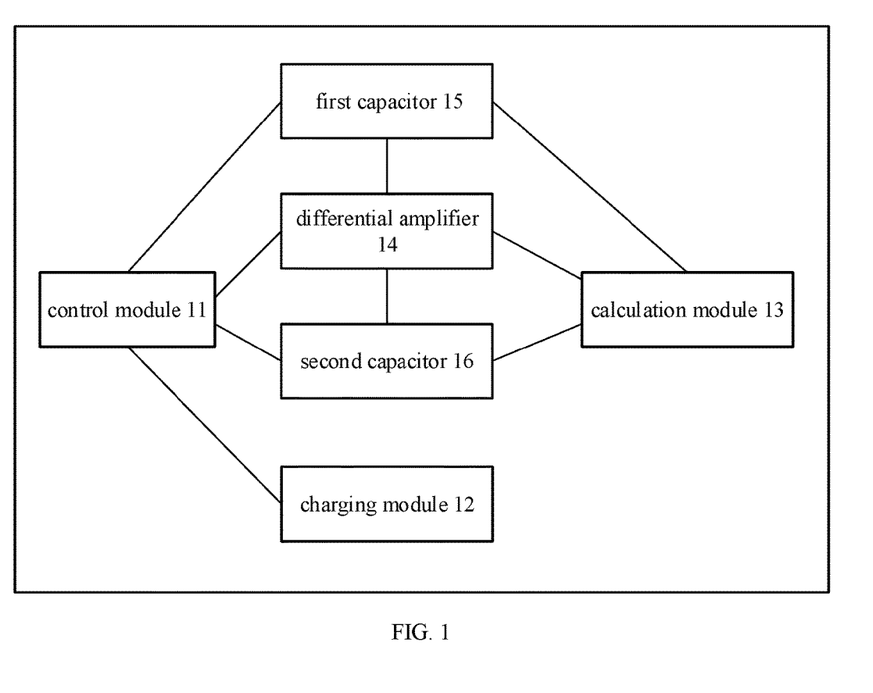
FIG. 1 is a schematic diagram of a capacitive detection device of an embodiment of the present disclosure.

FIG. 1 is a schematic diagram of a capacitive detection device of an embodiment of the present disclosure. The capacitive detection device 10 shown in FIG. 1 includes a control module 11, a charging module 12, a calculation module 13, a differential amplifier 14, a first capacitor 15 and a second capacitor 16.

Specifically, the charging module may be controlled by the control module to charge two capacitors to be detected (for example, a third capacitor and a fourth capacitor), and the first capacitor and the second capacitor are controlled by the control module to discharge until an amount of charge of both ends of the first capacitor and the second capacitor is zero. Then, charges of the charged third and fourth capacitors are transferred to the first capacitor and the second capacitor. A voltage of one end of the third capacitor and a voltage of one end of the fourth capacitor are input into the differential amplifier, and two voltages are obtained from two output terminals of the differential amplifier. The voltages of the output terminals of the differential amplifier flow to the calculation module, so that the calculation module obtains a difference between a capacitance of the third capacitor and a capacitance of the fourth capacitor according to a supply voltage of the charging module, voltages of the two output terminals of the differential amplifier, a charge transfer coefficient that an amount of charge of both ends of the third and fourth capacitors transfers to the first and the second capacitors, and a capacitance of the first capacitor and a capacitance of the second capacitor.

According to an embodiment of the present disclosure, two capacitors to be detected may be charged, then an amount of charge of the capacitors to be detected is transferred to a capacitor in a capacitive detection circuit, and a voltage of the capacitor to be detected after discharge is amplified and output to a calculation module through a differential amplifier, so that detection of capacitance difference of different capacitors may be realized based on calculation of a voltage at an output terminal of the differential amplifier.

In an embodiment of the present disclosure, the capacitive detection device further includes a first variable capacitor and a second variable capacitor. For example, the first variable capacitor is connected in parallel to a third capacitor, the second variable capacitor is connected in parallel to a fourth capacitor, and a sum of a capacitance of the first variable capacitor and a capacitance of the third capacitor is equal to a sum of a capacitance of the second variable capacitor and a capacitance of the fourth capacitor.

In an embodiment of the present disclosure, the capacitive detection device further includes a first variable resistor and a second variable resistor, the first variable resistor is connected in parallel to the first capacitor, and the second variable resistor is connected in parallel to the second capacitor.

Energization of a capacitive detection device may result in temperature changes, so that a capacitance of a capacitor changes. According to the embodiment of the present disclosure, a capacitance difference between two capacitors may be detected. The two capacitors are disposed in a same plane and they are close to each other. Temperature change may be simultaneously fed back to the two capacitors to be detected, and changes or influences on the two capacitors to be detected caused by the temperature change are the same. In this case, a differential processing is performed, so that influences caused by the temperature change may be offset, and temperature drift can be suppressed.

According to the embodiment of the present disclosure, when a capacitive active pen applies different pressures to a touch screen, the capacitive detection device may simulate the pressures according to detected capacitance change, so as to simulate experience that a real pen is used for writing.

Thus, a more accurate input is obtained through the capacitive active pen and user experience can be greatly improved.

The capacitive detection device in the embodiment of the present disclosure may also sense a pressure of a finger by detecting a difference of capacitance with respect to the conventional key or fingerprint recognition, so as to improve user experience.

In addition, the capacitive detection device in the embodiment of the present disclosure can also obtain a pressure on a screen of a mobile phone by detecting a difference of capacitance, so that the screen of the mobile phone becomes a high-precision electronic scale, thereby improving an application scenario of the mobile phone and optimizing user experience for pressures.

A capacitive detection device of the present disclosure will be described in detail below with reference to specific embodiments.

Figure 2:
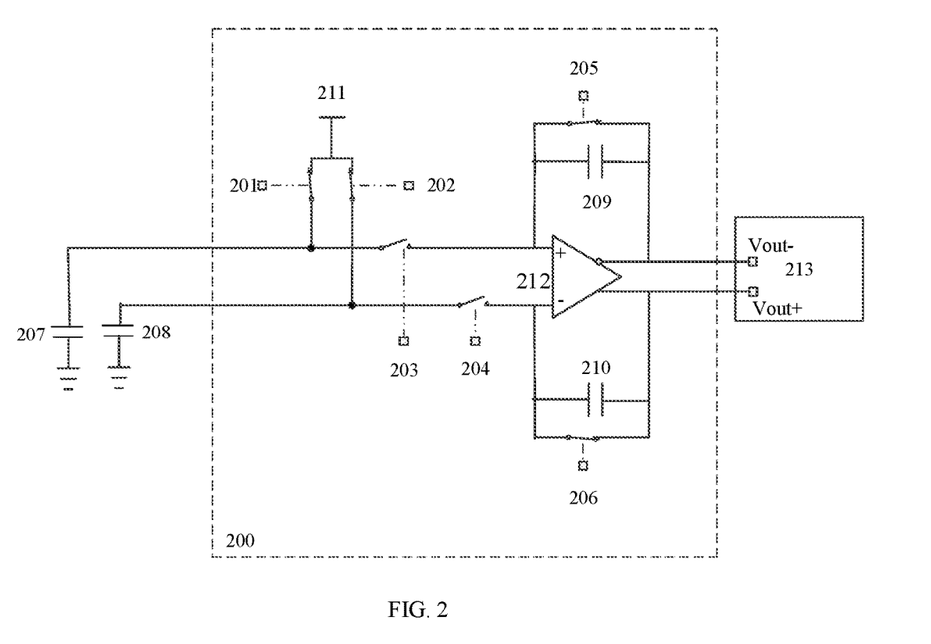
FIG. 2 is a circuit schematic diagram of a capacitive detection device of an embodiment of the present disclosure.

FIG. 2 is a circuit schematic diagram of a capacitive detection device of an embodiment of the present disclosure.

A third capacitor 207 and a fourth capacitor 208 are capacitors to be detected. The third capacitor and the fourth capacitor in the embodiment of the present disclosure are self-capacitors.

A circuit of the capacitive detection device includes a control module, a first capacitor 209, a second capacitor 210, a charging module 211, a differential amplifier 212 and a calculation module 213, where the control module includes a first switch 201, a second switch 202, a third switch 203, a fourth switch 204, a fifth switch 205 and a sixth switch 206.

In an embodiment of the present disclosure, the charging module 211 may be a power supply.

One end of the first switch 201 is connected to the power supply 211, the other end of the first switch 201 is connected to one end of a third capacitor 207, and the other end of the third capacitor 207 is grounded. One end of the second switch 202 is connected to the power supply 211, the other end of the second switch 202 is connected to one end of a fourth capacitor 208, and the other end of the fourth capacitor 208 is grounded.

One end of the third switch 203 is connected to one end of the third capacitor 207, and the other end of the third switch 203 is connected to the first capacitor 209. One end of the fourth switch 204 is connected to one end of the fourth capacitor 208, and the other end of the fourth switch 204 is connected to the second capacitor 210.

The fifth switch 205 is connected in parallel to the first capacitor 209. The sixth switch 206 is connected in parallel to the second capacitor 210.

The differential amplifier includes a first input terminal, a second input terminal, a first output terminal and a second output terminal. The first input terminal (e.g., non-inverting input terminal) of the differential amplifier 212 is connected to the third capacitor 207 through the third switch 203. The second input terminal (e.g., inverting input terminal) of the differential amplifier 212 is connected to the fourth capacitor 208 through the fourth switch 204. Two output terminals of the differential amplifier are connected to the calculation module 213. The first input terminal of the differential amplifier is connected to a third capacitor to be detected, the second input terminal is connected to a fourth capacitor to be detected, the first input terminal and the first output terminal are respectively connected to two ends of the first capacitor, the second input terminal and the second output terminal are respectively connected to two ends of the second capacitor, and both the first output terminal and the second output terminal are connected to the calculation module.

According to an embodiment of the present disclosure, two capacitors to be detected may be charged, then an amount of charge of the capacitors to be detected is transferred to a capacitor in a capacitive detection circuit, and a differential amplifier amplifies a signal and output the amplified signal to a calculation module, so that detection of capacitance difference of different capacitors may be realized based on calculation of a voltage at an output terminal of the differential amplifier.

The first phase is the charge reset phase, a capacitor to be detected is charged, and both the first capacitor 209 and the second capacitor 210 are discharged until a charge amount becomes zero. Specifically, the first switch 201 and the second switch 202 are closed, the third switch 203 and the fourth switch 204 are open, and the fifth switch 205 and the sixth switch 206 are closed. In this case, in the capacitive detection device, the power supply 211 performs charging on the third capacitor 207 and the fourth capacitor 208, until charging to V. The fifth switch 205 and the sixth switch 206 are closed, both ends of the first capacitor 209 and the second capacitor 210 are connected by wires, and a voltage at both ends of the first capacitor 209 and the second capacitor 210 is discharged to a common mode voltage. In this case, a voltage at both ends of the first capacitor is zero, a voltage at both ends of the second capacitor is also zero, and an amount of charge at both ends of the first capacitor and the second capacitor is also zero. In this case, both voltages of two input terminals of the differential amplifier are common-mode voltages, and a voltage difference of the two output terminals is 0, namely $V_{out+} - V_{out-} = 0$.

The second phase is a discharging detection phase, and charged charge amount of the third capacitor 207 to be detected and the fourth capacitor 208 to be detected is transferred to the first capacitor 209 and the second capacitor 210. Specifically, the first switch and the second switch may be open, the third switch and the fourth switch are closed, and the fifth switch and the sixth switch are open. In this case, in the capacitive detection device, the power supply 211 disconnects charging of the third capacitor 207 and the fourth capacitor 208. The third capacitor 207 and the fourth capacitor 208 respectively discharge to two input terminals of the differential amplifier 212. An amount of charge at both ends of the third capacitor 207 and the fourth capacitor 208 are respectively transferred to the first capacitor 209 and the second capacitor 210.

In one embodiment of the present disclosure, capacitances of the third capacitor to be detected and the fourth capacitor to be detected are denoted as $C_{x1}$ and $C_{x2}$, respectively. Capacitance values of different capacitors to be detected may cause different voltages at two output terminals of the differential amplifier. $V_{out+}$ and $V_{out-}$ denote voltages of the two output terminals of the differential amplifier, respectively. $C_{fb1}$ and $C_{fb2}$ respectively represent capacitance values of the first capacitor and the second capacitor, k is a charge transfer coefficient, and a capacitance difference of the third capacitor to be detected and the fourth capacitor to be detected is:

$\Delta C = C_{x1} - C_{x2}$, where when $C_{fb1} = C_{fb2} = C_{fb}$, for $C_{x1}$, charge transfer coefficient $k = (C_{fb} - 0.5 * C_{fb} - 0.5 * C_{x1}) / (C_{fb} + C_{x1})$ is achieved.

for $C_{x2}$, charge transfer coefficient $k = (C_{fb} - 0.5 * C_{fb} - 0.5 * C_{x2}) / (C_{fb} + C_{x2})$ is achieved.

Specifically, when $C_{f1} = C_{fb2} = C_{fb}$, a capacitance difference between the third capacitor to be detected and the fourth capacitor to be detected is $$\Delta C = C_{x1} - C_{x2} = \frac{C_{fb}}{V*k}(V_{out+} - V_{out-}).$$

When $C_{fb1}$ and $C_{fb2}$ are set to a same value, it may make the circuit easy to operate, so that capacitive detection sensitivity can be higher.

In the embodiment of the present disclosure, capacitance values of the first capacitor and the second capacitor in the capacitive detection device are not limited, and detection of a large capacitance can be achieved by using a smaller capacitance. For example, when capacitances of the first capacitor and the second capacitor are small, capacitances of the third capacitor and the fourth capacitor with larger capacitance values can also be detected. In this way, a chip area in a circuit of the capacitive detection device can be saved.

In the embodiment of the present disclosure, a supply voltage of a charging module is not limited, and in the embodiment of the present disclosure, a capacitor to be detected may be charged with a lower voltage.

Figure 3:
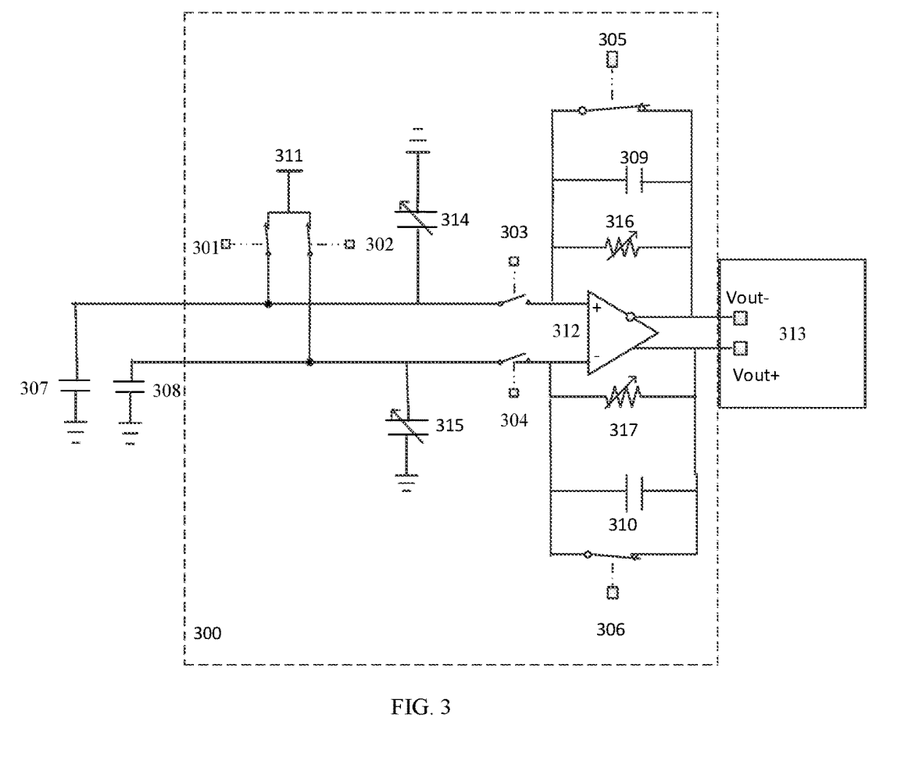
FIG. 3 is a circuit schematic diagram of a capacitive detection device of another embodiment of the present disclosure.

FIG. 3 is a circuit schematic diagram of a capacitive detection device of another embodiment of the present disclosure. A third capacitor 307 and a fourth capacitor 308 in FIG. 3 are capacitors to be detected.

A circuit of the capacitive detection device includes a control module, a first capacitor 309, a second capacitor 310, a charging module 311, a differential amplifier 312, a calculation module 313, a first variable capacitor 314, a second variable capacitor 315, a first variable resistor 316 and a second variable resistor 317, where the control module includes a first switch 301, a second switch 302, a third switch 303, a fourth switch 304, a fifth switch 305 and a sixth switch 306. The devices and modules 301-313 in FIG. 3 of the embodiment of the present disclosure are connected in a same manner and have a same function as the corresponding devices and modules 201-213 in FIG. 2, and details are not illustrated herein.

In one embodiment of the present disclosure, two variable capacitors, such as the first variable capacitor 314 and the second variable capacitor 315 in FIG. 3, may be added to the circuit in FIG. 2. The first variable capacitor 314 is connected in parallel to the third capacitor 307, the second variable capacitor 315 is connected in parallel to the fourth capacitor 308, and a sum of a capacitance of the first variable capacitor 314 and a capacitance of the third capacitor 307 is equal to a sum of a capacitance of the second variable capacitor 315 and a capacitance of the fourth capacitor 308. In this case, a capacitance value of the capacitors to be detected 307 and 308 does not change in the absence of pressure. In general, capacitance values of capacitors to be detected are equal in the absence of pressure. However, due to manufacturing errors, a difference between capacitance values of two capacitors to be detected may not be zero in the absence of pressure. The difference may cause an output of the differential amplifier 312 to have a voltage, occupying a dynamic range of a circuit and affecting sensitivity of the circuit.

In an embodiment of the present disclosure, adding the variable capacitors 314 and 315 and adjusting capacitances of the variable capacitors in the absence of pressure to allow a sum of a capacitance of the first variable capacitor 314 and a capacitance of the third capacitor 307 to be equal to a sum of a capacitance of the second variable capacitor 315 and a capacitance of the fourth capacitor 308. In this case, when there is no pressure, no voltage is output at an output terminal of the differential amplifier 312, thereby improving measurement sensitivity when there is a pressure.

In one embodiment of the present disclosure, two variable capacitors, such as the first variable resistor 316 and the second variable resistor 317 in FIG. 3, may be added to the circuit in FIG. 2. The first variable resistor 316 is connected in parallel to the first capacitor 309, and the second variable resistor 317 is connected in parallel to the second capacitor 310. In one embodiment of the present disclosure, a frequency response of a circuit may be controlled by adding two variable resistors, so as to resist interference in an environment with interference, thereby improving signal-to-noise ratio.

In one embodiment of the present disclosure, in order to optimize a working state of a circuit and improve sensitivity of the circuit, two resistance values of the first variable resistance and the second variable resistance may be set to be the same at a same time. It is assumed that both resistance values are R, when a working frequency of the circuit is f, R can be set to meet the following condition:

$$R \geq \frac{1}{2\pi f C_{fb}}.$$

Figure 4:
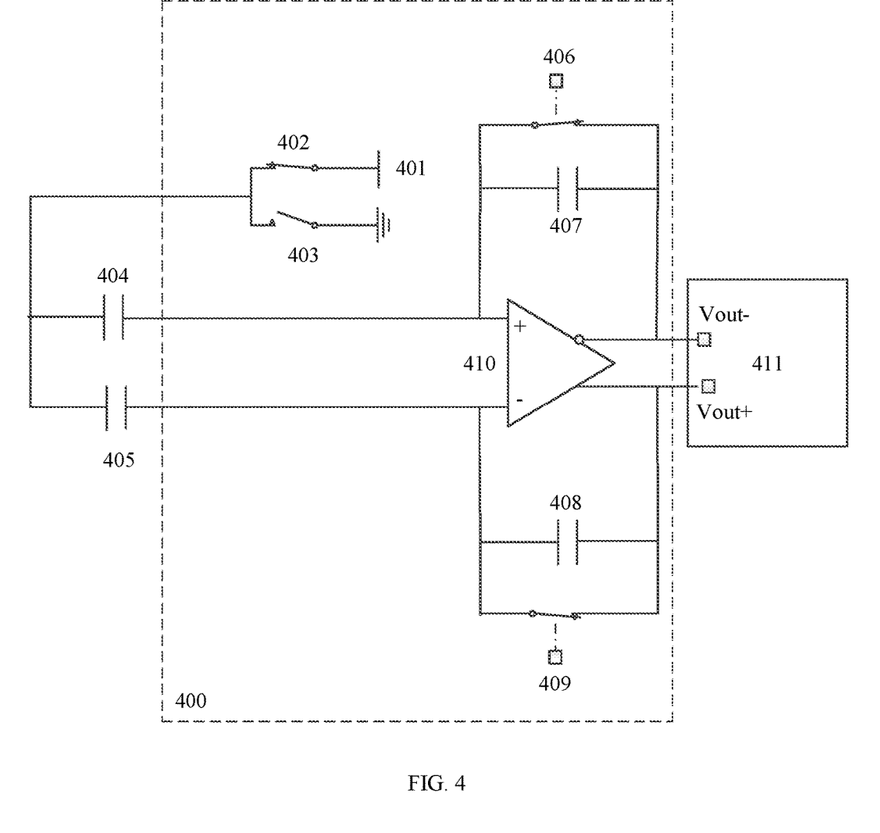
FIG. 4 is a circuit schematic diagram of a capacitive detection device of yet another embodiment of the present disclosure.

FIG. 4 is a circuit schematic diagram of a capacitive detection device of yet another embodiment of the present disclosure.

A third capacitor 404 and a fourth capacitor 405 in FIG. 4 are capacitors to be detected. The third capacitor 404 and the fourth capacitor 405 may be mutual capacitance capacitors.

A circuit of the capacitive detection device includes a control module, a first capacitor 407, a second capacitor 408, a charging module 401, a differential amplifier 410 and a calculation module 411, where the control module includes a seventh switch 402, an eighth switch 403, a ninth switch 406 and a tenth switch 409.

In one embodiment of the present disclosure, the charging module 401 may be a power supply.

One end of the seventh switch 402 is connected to the power supply 401, one end of the eighth switch 403 is grounded and the other end is connected to one end of the two capacitors 404 and 405 to be detected. The two other ends of the two capacitors to be detected are respectively connected to two input terminals of the differential amplifier 410, and two output terminals of the differential amplifier 410 are connected to the calculation module 411. Two ends of the first capacitor 407 are respectively connected to one input terminal (e.g., non-inverting input terminal in FIG. 4) and one output terminal (e.g., Vout– in FIG. 4) of the differential amplifier 410, and two ends of the second capacitor 408 are respectively connected with the other input terminal (e.g., inverting input terminal in FIG. 4) and the other output terminal (e.g., Vout+ in FIG. 4) of the differential amplifier 410. The ninth switch 406 is connected in parallel to the first capacitor 407, and the tenth switch 409 is connected in parallel to the second capacitor 408.

According to an embodiment of the present disclosure, two capacitors to be detected may be charged, then an amount of charge of the capacitors to be detected is transferred to a capacitor in a capacitive detection circuit, and a voltage of the capacitor to be detected after discharge is amplified and output to a calculation module through a differential amplifier, so that detection of capacitance difference of different capacitors may be realized based on calculation of a voltage at an output terminal of the differential amplifier.

Specifically, when the seventh switch 402 is open, the eighth switch 403 is closed, the ninth switch 406 is closed and the tenth switch 409 is closed, the circuit is in a reset state. Voltages at both ends of the first capacitor 407 and the second capacitor 408 are discharged to zero, and voltages of the two output terminals of the differential amplifier 410 are equal, that is, a voltage difference of the output terminal is zero.

The first phase is a charge phase, where a capacitor to be detected is charged. Specifically, the seventh switch 402 is closed, the eighth switch 403 is open, the ninth switch 406 is open and the tenth switch 409 is open. In this case, the power supply 401 performs charging on the third capacitor 404 and the fourth capacitor 405, until charging to V.

The second phase is a discharging phase, where charged charge amount of the third capacitor 404 to be detected and the fourth capacitor 405 to be detected is transferred to the first capacitor 407 and the second capacitor 408. Specifically, the seventh switch 402 may be open, the eighth switch 403 may be closed, the ninth switch 406 may be open and the tenth switch 409 may be open.

According to the above charging and discharging phase, after the circuit is reset, the switch 407 and the switch 408 can be open, the switch 402 and the switch 403 can be open or closed alternately, so that charging and discharging can be alternately performed.

In one embodiment of the present disclosure, capacitances of the third capacitor to be detected and the fourth capacitor to be detected are denoted as $C_{x1}$ and $C_{x2}$, respectively. Capacitance values of different capacitors to be detected may cause different voltages at two output terminals of the differential amplifier. $V_{out+}$ and $V_{out-}$ denote voltages of the two output terminals of the differential amplifier, respectively. $C_{fb1}$ and $C_{fb2}$ respectively represent capacitance values of the first capacitor and the second capacitor, k is a charge transfer coefficient, and a capacitance difference of the third capacitor to be detected and the fourth capacitor to be detected is:

$\Delta C = C_{x1} - C_{x2}$, where when $C_{fb1} = C_{fb2} = C_{fb}$, for $C_{x1}$, charge transfer coefficient $k = (C_{fb} - 0.5*C_{fb} - 0.5*C_{x1})/(C_{fb} + C_{x1})$ is achieved.

for $C_{x2}$, charge transfer coefficient $k = (C_{fb} - 0.5*C_{fb} - 0.5*C_{x2})/(C_{fb} + C_{x2})$ is achieved.

Specifically, when $C_{fb1} = C_{fb2} = C_{fb}$, a capacitance difference between the third capacitor to be detected and the fourth capacitor to be detected is $$C_{x1} - C_{x2} = \frac{C_{fb}}{V*k}(V_{out+} - V_{out-}).$$

When $C_{fb1}$ and $C_{fb2}$ are set to a same value, it may make the circuit easy to operate, so that capacitive detection sensitivity can be higher.

Figure 5:
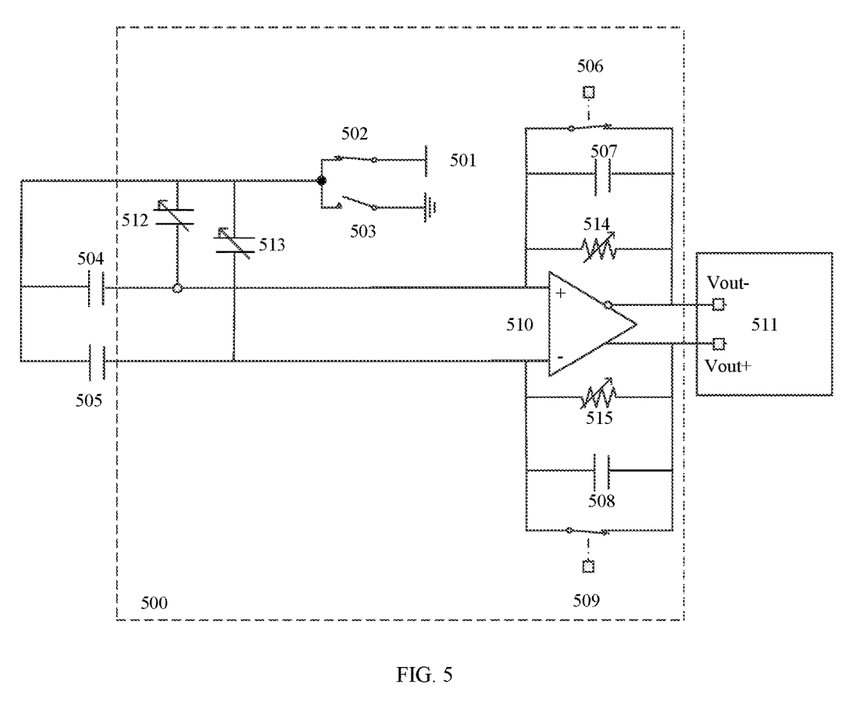
FIG. 5 is a circuit schematic diagram of a capacitive detection device of yet another embodiment of the present disclosure.

FIG. 5 is a circuit schematic diagram of a capacitive detection device of yet another embodiment of the present disclosure.

A third capacitor 504 and a fourth capacitor 505 in FIG. 5 are capacitors to be detected.

A circuit of the capacitive detection device includes a control module, a first capacitor 507, a second capacitor 508, a charging module 501, a differential amplifier 510, a calculation module 511, a first variable capacitor 512, a second variable capacitor 513, a first variable resistor 514 and a second variable resistor 515, where the control module includes a seventh switch 502, an eighth switch 503, a ninth switch 506 and a tenth switch 509. The devices and modules 501-511 in FIG. 5 of the embodiment of the present disclosure are connected in a same manner and have a same function as the corresponding devices and modules 401-411 in FIG. 4, and details are not illustrated herein.

In one embodiment of the present disclosure, two variable capacitors, such as the first variable capacitor 512 and the second variable capacitor 513 in FIG. 5, may be added to the circuit in FIG. 4. The first variable capacitor 512 is connected in parallel to the third capacitor 504, the second variable capacitor 513 is connected in parallel to the fourth capacitor 505, and a sum of a capacitance of the first variable capacitor 512 and a capacitance of the third capacitor 504 is equal to a sum of a capacitance of the second variable capacitor 513 and a capacitance of the fourth capacitor 505. In this case, a capacitance value of the capacitors to be detected does not change in the absence of pressure. In general, capacitance values of capacitors to be detected are equal in the absence of pressure. However, due to manufacturing errors, a difference between capacitance values of two capacitors to be detected may not be zero in the absence of pressure. The difference may cause an output of the differential amplifier to have a voltage, occupying a dynamic range of a circuit and affecting sensitivity of the circuit.

In one embodiment of the present disclosure, a capacitive detection device in the embodiment of the present disclosure may be applied to a mobile phone for detecting a pressure applied to a display screen of the mobile phone according to a capacitance difference, and applied to an active pen for detecting a pressure according to a capacitance difference. In these cases, it involves adjusting a variable capacitor to increase sensitivity of a pressure detection before a pressure is applied. For example, in a capacitive detection device, adding a variable capacitor and adjusting a capacitance of the variable capacitor in the absence of pressure to allow a sum of a capacitance of a first variable capacitor and a capacitance of a third capacitor to be equal to a sum of a capacitance of a second variable capacitor and a capacitance of a fourth capacitor. In this case, when there is no pressure, no voltage is output at an output terminal of a differential amplifier, thereby improving measurement sensitivity when there is a pressure.

In one embodiment of the present disclosure, two variable capacitors, such as the first variable resistor 514 and the second variable resistor 515 in FIG. 5, may be added to the circuit in FIG. 4. A first variable resistor is connected in parallel to a first capacitor, and a second variable resistor is connected in parallel to a second capacitor. In one embodiment of the present disclosure, a frequency response of a circuit may be controlled by adding two variable resistors, so as to resist interference in an environment with interference, thereby improving signal-to-noise ratio.

In one embodiment of the present disclosure, in order to optimize a working state of a circuit and improve sensitivity of the circuit, two resistance values of the first variable resistance and the second variable resistance may be set to be the same. It is assumed that both resistance values are R, when a working frequency of the circuit is f, R can be set to meet the following condition:

$$R \geq \frac{1}{2\pi f C_{fb}}.$$

A circuit schematic diagram of the capacitive detection device is described in detail above with reference to FIG. 1 to FIG. 5, and an application example of the above capacitive detection device will be described below with reference to FIG. 6 and FIG. 7. The illustration of FIG. 6 and FIG. 7 herein will take an exemplary pressure detection of a mobile phone as an example.

Figure 6:
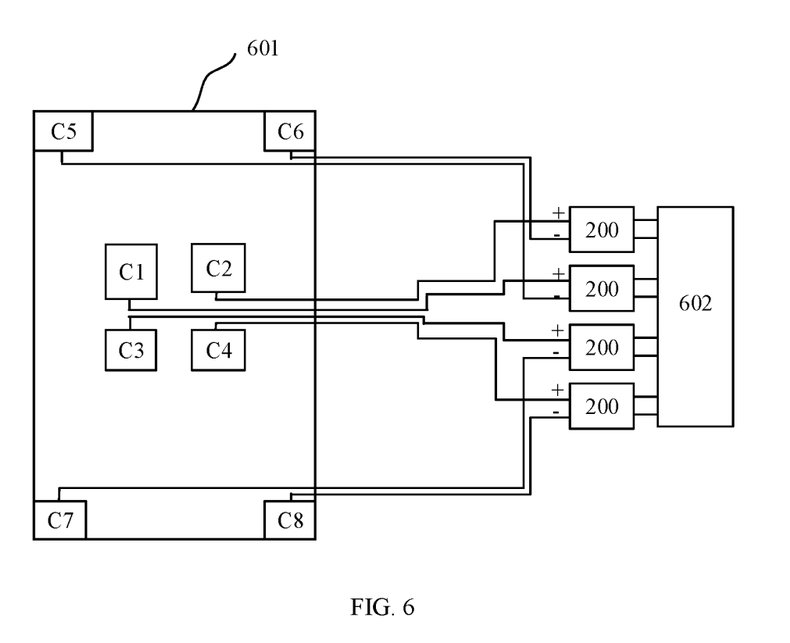
FIG. 6 is a schematic diagram of a pressure detection system formed by a capacitive detection device of an embodiment of the present disclosure.

FIG. 6 is a schematic diagram of a pressure detection system formed by a capacitive detection device of an embodiment of the present disclosure.

The pressure detection system includes at least one capacitive detection device 200, a display screen 601 of a mobile phone, a detection electrode of a capacitor to be detected and a pressure detection module 602, where the capacitor to be detected includes C1, C2, C3, C4, C5, C6, C7 and C8. In one embodiment of the present disclosure, a capacitor to be detected may be a self-capacitor. One end of the capacitor to be detected is grounded and the other end is a detection electrode. The detection electrode may be located between a display screen and a middle frame, and there is a gap between the detection electrode and the middle frame. For example, the detection electrode can be attached to the back of the display. Each capacitive detection device 200 is connected to two detection electrodes to be detected to detect a capacitance difference between two capacitors.

A finger presses the display screen of the mobile phone to cause deformation, so that a capacitance to ground of the detection electrode changes, that is, a capacitance of the capacitor to be detected changes. A capacitance difference between two capacitors to be detected may be obtained through a circuit diagram of the capacitive detection device, so as to implement pressure detection. In one embodiment of the present disclosure, C1, C2, C3 and C4 may be disposed in the middle, while C5, C6, C7 and C8 may be disposed on the corners. A capacitance to ground is obviously changed when a middle capacitor is under pressure, while a capacitance to ground changes little when a capacitor on the corner is under pressure. A differencing operation is performed between a capacitance of the capacitor in the middle and a capacitance of the capacitor on the corner to obtain a capacitance difference of two capacitors. In this way, it may reduce a variation of capacitance due to change of an external environment by calculating a capacitance difference of capacitors in a same environment. For example, if an ambient temperature or humidity is different, a capacitance of a same capacitor in a same state may be different. According to one embodiment of the present disclosure, calculating a difference between two capacitances can prevent a capacitance from drift caused by a change in temperature, humidity or the like.

In one embodiment of the present disclosure, a detection electrode may be attached to the back of a display screen, and there is a certain gap between the detection electrode and a middle frame. The gap may be filled with air or an elastic material.

In one embodiment of the present disclosure, a number of capacitive detection device 200 may be one or more, which is not limited in this embodiment of the present disclosure. Four capacitive detection devices are taken as an example for description in FIG. 6.

In one embodiment of the present disclosure, a capacitive detection device 200 may be a circuit diagram 200 shown in FIG. 2, or a circuit diagram 300 shown in FIG. 3 with a variable capacitor and/or a variable resistor added on the basis of 200. The capacitive detection device shown in FIG. 6 is an example of detection device shown in FIG. 2.

The pressure detection module 602 in the embodiment of the present disclosure may obtain a pressure to be detected according to a capacitance difference obtained by the capacitive detection device.

Figure 7:
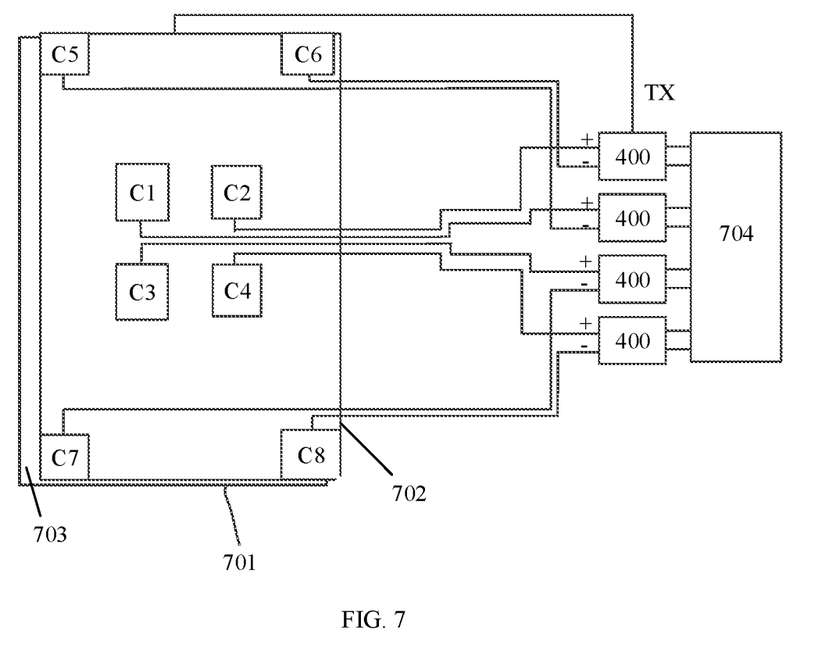
FIG. 7 is a schematic diagram of a pressure detection system formed by a capacitive detection device of another embodiment of the present disclosure.

FIG. 7 is a schematic diagram of a pressure detection system formed by a capacitive detection device of another embodiment of the present disclosure.

The pressure detection system includes at least one capacitive detection device 400, a display screen 701 of a mobile phone, a middle frame 702, two detection electrodes 703 of a capacitor to be detected and a pressure detection module 704, where the capacitor to be detected includes C1, C2, C3, C4, C5, C6, C7 and C8. Each capacitor to be detected includes two electrodes, and both electrodes are located between a display of a mobile phone and a middle frame. Each capacitive detection device 400 is configured to detect a capacitance difference between two capacitors.

A finger presses the display screen of the mobile phone to cause deformation, so that a capacitance of the detection electrode changes. A capacitance difference may be obtained through a circuit diagram of the capacitive detection device, so as to implement pressure detection. In one embodiment of the present disclosure, C1, C2, C3 and C4 may be disposed in the middle, while C5, C6, C7 and C8 may be disposed on the corners. A capacitance is obviously changed when a middle capacitor is under pressure, while a capacitance changes little when a capacitor on the corner is under pressure. A differencing operation is performed between a capacitance of the capacitor in the middle and a capacitance of the capacitor on the corner to obtain a capacitance difference of two capacitors. In this way, it may reduce a variation of capacitance due to change of an external environment by calculating a capacitance difference of capacitors in a same environment. For example, if an ambient temperature or humidity is different, a capacitance of a same capacitor in a same state may be different. According to an embodiment of the present disclosure, calculating a difference between two capacitances can prevent a capacitance from drift caused by a change in temperature, humidity or the like.

In one embodiment of the present disclosure, one of two electrodes of the capacitor to be detected is attached to the back of a display screen and the other to the middle frame, so that a gap is formed between the two electrodes. The gap herein may be filled with air or an elastic material.

In one embodiment of the present disclosure, a capacitive detection device 400 may be shown as a circuit diagram 400 in FIG. 4, or a circuit diagram 500 shown in FIG. 5 with a variable capacitor and/or a variable resistor added on the basis of 400. The capacitive detection device shown in FIG. 7 is an example of a detection device shown in FIG. 4.

A pressure detection module 704 in the embodiment of the present disclosure may obtain a pressure to be detected according to a capacitance difference obtained by the capacitive detection device.

Figure 8:
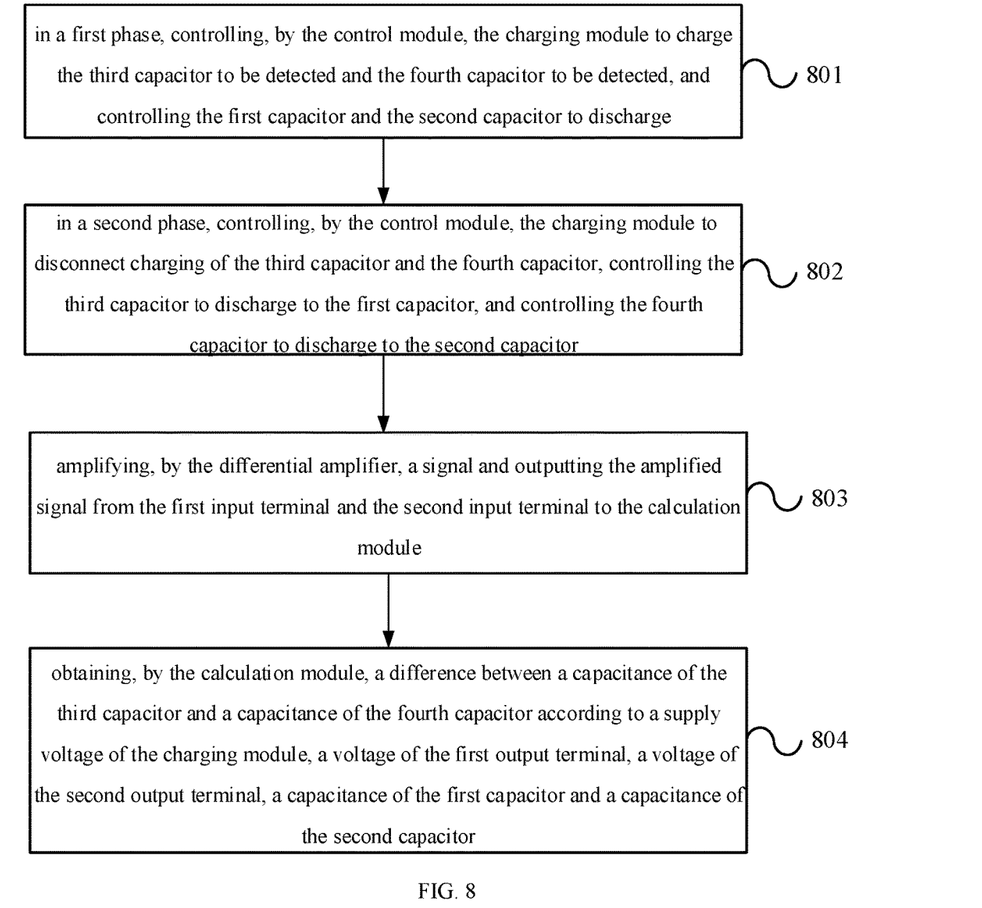
FIG. 8 is a schematic flowchart of a capacitive detection method of an embodiment of the present disclosure.

FIG. 8 is a schematic flowchart of a capacitive detection method of an embodiment of the present disclosure. The capacitive detection method in the embodiment of the present disclosure may be executed by a capacitive detection device. The capacitive detection device may include a differential amplifier, a first capacitor, a second capacitor, a charging module, a control module and a calculation module, where the differential amplifier includes a first input terminal, a second input terminal, a first output terminal and a second output terminal. The first input terminal is connected to a third capacitor to be detected and the second input terminal is connected to a fourth capacitor to be detected. A specific flow of the capacitive detection method is as follows:

801, in a first phase, controlling, by the control module, the charging module to charge the third capacitor to be detected and the fourth capacitor to be detected, and controlling the first capacitor and the second capacitor to discharge;

802, in a second phase, controlling, by the control module, the charging module to terminate charging for the third capacitor and the fourth capacitor, controlling the third capacitor to discharge to the first capacitor, and controlling the fourth capacitor to discharge to the second capacitor;

803, amplifying, by the differential amplifier, a signal and outputting the amplified signal from the first input terminal and the second input terminal to the calculation module; and 804, obtaining, by the calculation module, a difference between a capacitance of the third capacitor and a capacitance of the fourth capacitor according to a supply voltage of the charging module, a voltage of the first output terminal, a voltage of the second output terminal, a capacitance of the first capacitor and a capacitance of the second capacitor.

According to an embodiment of the present disclosure, two capacitors to be detected may be charged, then an amount of charge of the capacitors to be detected is transferred to a capacitor in a capacitive detection circuit, and a differential amplifier amplifies a signal and output the amplified signal to a calculation module, so that detection of capacitance difference of different capacitors may be realized based on calculation of a voltage at an output terminal of the differential amplifier.

The capacitive detection method according to the embodiment of the present disclosure may correspond to each unit/module in the capacitive detection device according to the embodiment of the present disclosure. Moreover, corresponding flow in the method may be implemented by each unit/module in the device shown in FIG. 1 to FIG. 7, and thus detailed description thereof will not be repeated redundantly herein for simplicity.

It should be understood that, "one embodiment" or "an embodiment" mentioned throughout the specification means that a particular feature, structure or characteristic described in connection with the embodiment is included in at least one embodiment of the present disclosure. Thus, "in one embodiment" or "in an embodiment" appearing in various places throughout the specification are not necessarily all referring to the same embodiment. Furthermore, the particular features, structures, or characteristics may be combined in one or more embodiments in any suitable manner.

It should be understood that, in various embodiments of the present disclosure, values of sequence numbers of the above-mentioned various processes do not mean an order of execution, which should be determined upon functionalities and internal logics thereof, rather than setting any limitation to implementation of the embodiment of the present disclosure.

It should be understood that, in the embodiment of the present disclosure, "B corresponding to A" means that B is associated with A, and B can be determined according to A. However, it should also be understood that determining B according to A does not imply that B is determined only according to A, B may also be determined according to A and/or other information.

In addition, the terms "system" and "network" are always used interchangeably herein. It should be understood that the term "and/or" herein merely describes association relations between associated objects, and expresses three relations, for example, A and/or B may express three conditions, namely A exists separately, A and B exist simultaneously and B exists separately. In addition, the character "/" in the present disclosure generally represents an "or" relationship of two related objects before and after the character.

Persons of ordinary skill in the art may be aware that, the exemplary units and algorithm steps described in combination with the embodiments disclosed here can be implemented by electronic hardware or a combination of computer software and electronic hardware. Whether the functions are executed in a manner of hardware or software depends on a particular application and a design constraint condition of the technical solutions. Persons skilled in the art may use different methods to implement the described functions for every particular application, but it should not be considered that such implementation goes beyond the scope of the present disclosure.

In the several embodiments provided in the present application, it should be understood that, the disclosed system, apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separated, and parts shown as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

Those skilled in the art may understand that all of or part of the steps in above method implementations may be implemented by a program instructing relevant hardware. The program may be stored in a computer readable storage medium. The storage medium referred to herein may include a variety of media capable of storing program codes, such as a USB disk, a mobile hard disk, a read-only memory (ROM, Read-Only Memory), a random access memory (RAM, Random Access Memory), a magnetic disk, an optical disk or the like.

The foregoing descriptions are merely specific implementations of the present disclosure, but are not intended to limit the protection scope of the present disclosure. Any variation or replacement readily figured out by persons of ordinary skill in the art within the technical scope disclosed in the present disclosure shall fall within the protection scope of the present disclosure. Therefore, the protection scope of the claims should prevail over the protection scope of the present disclosure.

What is claimed is:

1. A capacitive detection device, wherein the device comprises:
   a differential amplifier comprising a first input terminal, a second input terminal, a first output terminal and a second output terminal;

a first capacitor;
a second capacitor;
a charging module; and
a control module; and
a calculation module configured to obtain a difference between a capacitance of a third capacitor and a capacitance of a fourth capacitor according to a supply voltage of the charging module, a voltage of the first output terminal, a voltage of the second output terminal, a capacitance of the first capacitor and a capacitance of the second capacitor;
wherein, the first input terminal is connected to the third capacitor to be detected, the second input terminal is connected to the fourth capacitor to be detected, the first input terminal and the first output terminal are respectively connected to two ends of the first capacitor, the second input terminal and the second output terminal are respectively connected to two ends of the second capacitor, and both the first output terminal and the second output terminal are connected to the calculation module;
in a first phase, the control module is configured to control the charging module to charge the third capacitor and the fourth capacitor, and the control module is further configured to control the first capacitor and the second capacitor to discharge;
in a second phase, the control module is configured to control the charging module to terminate charging for the third capacitor and the fourth capacitor, and the control module is further configured to control the third capacitor to discharge to the first capacitor and control the fourth capacitor to discharge to the second capacitor; and
the differential amplifier is configured to amplify a signal and output the amplified signal from the first output terminal and the second output terminal to the calculation module.

2. The device according to claim 1, further comprising a first variable capacitor and a second variable capacitor, wherein the first variable capacitor is connected in parallel to the third capacitor and the second variable capacitor is connected in parallel to the fourth capacitor.

3. The device according to claim 2, further comprising a first variable resistor and a second variable resistor, wherein the first variable resistor is connected in parallel to the first capacitor and the second variable resistor is connected in parallel to the second capacitor.

4. The device according to claim 3, wherein a sum of a capacitance of the first variable capacitor and a capacitance of the third capacitor is equal to a sum of a capacitance of the second variable capacitor and a capacitance of the fourth capacitor before a capacitance value of the third capacitor or the fourth capacitor is changed externally.

5. The device according to claim 3, wherein a resistance of the first variable resistor and a resistance of the second variable resistor are the same at a same time.

6. The device according to claim 4, wherein a resistance of the first variable resistor and a resistance of the second variable resistor are the same at a same time.

7. The device according to claim 6, wherein,
the charging module is a power supply;
the control module comprises a first switch and a second switch;
one end of the first switch is connected to the power supply, the other end of the first switch is connected to one end of the third capacitor, and the other end of the third capacitor is grounded, the power supply charges the third capacitor when the first switch is closed, and the power supply disconnects charging of the third capacitor when the first switch is open; and
one end of the second switch is connected to the power supply, the other end of the second switch is connected to one end of the fourth capacitor, and the other end of the fourth capacitor is grounded, the power supply charges the fourth capacitor when the second switch is closed, and the power supply disconnects charging of the fourth capacitor when the second switch is open.

8. The device according to claim 6, wherein,
the control module comprises a third switch, a fourth switch, a fifth switch and a sixth switch;
one end of the third switch is connected to one end of the third capacitor, the other end of the third switch is connected to the first capacitor, and the fifth switch is connected in parallel to the first capacitor;
one end of the fourth switch is connected to one end of the fourth capacitor, the other end of the fourth switch is connected to the second capacitor, and the sixth switch is connected in parallel to the second capacitor;
in the first phase, the first capacitor discharges until an amount of charge of both ends of the first capacitor is zero when the third switch is open and the fifth switch is closed;
in the first phase, the second capacitor discharges until an amount of charge of both ends of the second capacitor is zero when the fourth switch is open and the sixth switch is closed;
in the second phase, the third capacitor discharges to the first capacitor when the charging module is disconnected from charging, the third switch is closed and the fifth switch is open; and
in the second phase, the fourth capacitor discharges to the second capacitor when the charging module is disconnected from charging, the fourth switch is closed and the sixth switch is open.

9. The device according to claim 1, wherein a capacitance of the first capacitor is the same as a capacitance of the second capacitor.

10. The device according to claim 1, wherein,
the charging module is a power supply;
the control module comprises a first switch and a second switch;
one end of the first switch is connected to the power supply, the other end of the first switch is connected to one end of the third capacitor, and the other end of the third capacitor is grounded, the power supply charges the third capacitor when the first switch is closed, and the power supply disconnects charging of the third capacitor when the first switch is open; and
one end of the second switch is connected to the power supply, the other end of the second switch is connected to one end of the fourth capacitor, and the other end of the fourth capacitor is grounded, the power supply charges the fourth capacitor when the second switch is closed, and the power supply disconnects charging of the fourth capacitor when the second switch is open.

11. The device according to claim 1, wherein,
the control module comprises a third switch, a fourth switch, a fifth switch and a sixth switch;
one end of the third switch is connected to one end of the third capacitor, the other end of the third switch is connected to the first capacitor, and the fifth switch is connected in parallel to the first capacitor;
one end of the fourth switch is connected to one end of the fourth capacitor, the other end of the fourth switch is connected to the second capacitor, and the sixth switch is connected in parallel to the second capacitor;

in the first phase, the first capacitor discharges until an amount of charge of both ends of the first capacitor is zero when the third switch is open and the fifth switch is closed;

in the first phase, the second capacitor discharges until an amount of charge of both ends of the second capacitor is zero when the fourth switch is open and the sixth switch is closed;

in the second phase, the third capacitor discharges to the first capacitor when the charging module is disconnected from charging, the third switch is closed and the fifth switch is open; and in the second phase, the fourth capacitor discharges to the second capacitor when the charging module is disconnected from charging, the fourth switch is closed and the sixth switch is open.

12. The device according to claim 1, wherein, the charging module is a power supply;

the control module comprises a seventh switch, an eighth switch, a ninth switch and a tenth switch;

a first terminal of the seventh switch is connected to the power supply, a second terminal of the seventh switch is connected to a first terminal of the third capacitor, a second terminal of the seventh switch is also connected to a first terminal of the fourth switch, a first terminal of the eighth switch is grounded, a second terminal of the eighth switch is connected to the first terminal of the third capacitor, the second terminal of the eighth switch is also connected to the first terminal of the fourth switch, a first input terminal of the differential amplifier is connected to a second terminal of the third capacitor, and a second input terminal of the differential amplifier is connected to a second terminal of the fourth capacitor; and the ninth switch is connected in parallel to the first capacitor, and the tenth switch is connected in parallel to the second capacitor.

13. The device according to claim 12, wherein, in the first phase, when the seventh switch, the ninth switch and the tenth switch are all closed and the eighth switch is open, the power supply charges the third capacitor and the fourth capacitor, and both the first capacitor and the second capacitor discharge until an amount of charge of both ends of the respective capacitor is zero; and in the second phase, when the seventh switch, the ninth switch and the tenth switch are all open and the eighth switch is closed, the third capacitor discharges to the first capacitor, and the fourth capacitor discharges to the second capacitor.

14. A pressure detection system, comprising:

a pressure detection module;

at least one capacitive detection device;

at least one third capacitor; and at least one fourth capacitor;

wherein, each capacitive detection device corresponds to a third capacitor to be detected and a fourth capacitor to be detected, and the pressure detection module is configured to obtain a detected pressure according to a difference between a capacitance of the at least one third capacitor and a capacitance of the at least one fourth capacitor;

the capacitive detection device comprises a differential amplifier, a first capacitor, a second capacitor, a charging module, a control module and a calculation module, wherein the differential amplifier comprises a first input terminal, a second input terminal, a first output terminal and a second output terminal;

the first input terminal is connected to the third capacitor to be detected, the second input terminal is connected to the fourth capacitor to be detected, the first input terminal and the first output terminal are respectively connected to two ends of the first capacitor, the second input terminal and the second output terminal are respectively connected to two ends of the second capacitor, and both the first output terminal and the second output terminal are connected to the calculation module;

in a first phase, the control module is configured to control the charging module to charge the third capacitor and the fourth capacitor, and the control module is further configured to control the first capacitor and the second capacitor to discharge;

in a second phase, the control module is configured to control the charging module to terminate charging for the third capacitor and the fourth capacitor, and the control module is further configured to control the third capacitor to discharge to the first capacitor and control the fourth capacitor to discharge to the second capacitor;

the differential amplifier is configured to amplify a signal and output the amplified signal from the first output terminal and the second output terminal to the calculation module; and the calculation module is configured to obtain a difference between a capacitance of the third capacitor and a capacitance of the fourth capacitor according to a supply voltage of the charging module, a voltage of the first output terminal, a voltage of the second output terminal, a capacitance of the first capacitor and a capacitance of the second capacitor.

15. The system according to claim 14, further comprising a display screen and a middle frame; wherein, the third capacitor and the fourth capacitor are self-capacitors, a detection electrode of the at least one third capacitor and a detection electrode of the at least one fourth capacitor are located between the display screen and the middle frame, a gap is formed between the detection electrode of the third capacitor and the middle frame, and a gap is formed between the detection electrode of the fourth capacitor and the middle frame.

16. A capacitive detection method performed by a capacitive detection device comprising a differential amplifier, a first capacitor, a second capacitor, a charging module, a control module and a calculation module, wherein the differential amplifier comprises a first input terminal, a second input terminal, a first output terminal and a second output terminal, the first input terminal is connected to a third capacitor to be detected and the second input terminal is connected to a fourth capacitor to be detected, the method comprising:

in a first phase, controlling, by the control module, the charging module to charge the third capacitor and the fourth capacitor, and controlling the first capacitor and the second capacitor to discharge;

in a second phase, controlling, by the control module, the charging module to terminate charging for the third capacitor and the fourth capacitor, controlling the third capacitor to discharge to the first capacitor, and controlling the fourth capacitor to discharge to the second capacitor;

amplifying, by the differential amplifier, a signal and outputting the amplified signal from the first output terminal and the second output terminal to the calculation module; and obtaining, by the calculation module, a difference between a capacitance of the third capacitor and a capacitance of the fourth capacitor according to a supply voltage of the charging module, a voltage of the first output terminal, a voltage of the second output terminal, a capacitance of the first capacitor and a capacitance of the second capacitor.

17. The method according to claim 16, wherein the capacitive detection device further comprises a first variable capacitor and a second variable capacitor, wherein the first variable capacitor is connected in parallel to the third capacitor, and the second variable capacitor is connected in parallel to the fourth capacitor.

18. The method according to claim 17, wherein the method further comprises:

adjusting a capacitance of the first variable capacitor and a capacitance of the second variable capacitor to allow a sum of the capacitance of the first variable capacitor and a capacitance of the third capacitor to be equal to a sum of the capacitance of the second variable capacitor and a capacitance of the fourth capacitor before a capacitance value of the third capacitor or the fourth capacitor is changed externally.

19. The method according to claim 17, wherein the capacitive detection device further comprises a first variable resistor and a second variable resistor, wherein the first variable resistor is connected in parallel to the first capacitor, and the second variable resistor is connected in parallel to the second capacitor.

20. The method according to claim 18, wherein the capacitive detection device further comprises a first variable resistor and a second variable resistor, wherein the first variable resistor is connected in parallel to the first capacitor, and the second variable resistor is connected in parallel to the second capacitor.

* * * * *